United States Patent [19]

Gruber

[11] 4,017,652
[45] Apr. 12, 1977

[54] PHOTOCATALYST SYSTEM AND ULTRAVIOLET LIGHT CURABLE COATING COMPOSITIONS CONTAINING THE SAME

[75] Inventor: Gerald W. Gruber, Sewickley, Pa.
[73] Assignee: PPG Industries, Inc., Pittsburgh, Pa.
[22] Filed: Oct. 23, 1974
[21] Appl. No.: 517,572
[52] U.S. Cl. .............................. 427/54; 204/159.23; 252/426
[51] Int. Cl.$^2$ ........................................ B05D 3/06
[58] Field of Search ............... 427/54; 204/159.14, 204/159.16, 159.23; 252/426

[56] References Cited

UNITED STATES PATENTS

| | | | |
|---|---|---|---|
| 3,368,900 | 2/1968 | Borg | 427/54 |
| 3,427,161 | 2/1969 | Laridon et al. | 427/35.1 |
| 3,756,827 | 9/1973 | Chang et al. | 204/159.23 |
| 3,759,807 | 9/1973 | Osborn et al. | 204/159.23 |
| 3,824,284 | 7/1974 | Rudolph et al. | 204/159.23 |
| 3,825,479 | 7/1974 | Carlick et al. | 204/159.23 |
| 3,827,960 | 8/1974 | McGinniss | 204/159.23 |

*Primary Examiner*—John H. Newsome
*Attorney, Agent, or Firm*—George D. Morris

[57] ABSTRACT

The oxygen inhibition of the photopolymerization of acrylic resins is reduced by employing a photocatalyst system containing an aromatic ketone and/or aromatic aldehyde photosensitizer having a triplet energy in the range of from about 54 kilocalories per mole to about 72 kilocalories per mole and which promotes polymerization through bimolecular photochemical reactions of the energy donor type and an aromatic ketone photoinitiator which generates a radical pair by way of unimolecular homolysis resulting from photoexcitation. An exemplary photocatalyst system is benzophenone and isobutyl benzoin ether.

20 Claims, No Drawings

PHOTOCATALYST SYSTEM AND ULTRAVIOLET LIGHT CURABLE COATING COMPOSITIONS CONTAINING THE SAME

Free radical polymerization of acrylic groups requires a souce of free radicals, and further requires that the polymer chain carrying radical be sufficiently reactive to add to an additional acrylic group. The initial souce of free radicals is usually provided by a catalyst which, upon absorption of energy, produces radical pairs. At least one member of the radical pair is then capable of initiating chain growth.

In the case of thermal polymerizations, initiators are used which absorb thermal energy and then produce radical pairs. Examples of such initiators are methyl ethyl ketone peroxide, dicumyl peroxide, tertiary butyl hydroperoxide, and $\alpha, \alpha'$-azobisisobutyronitrile.

In the case of photopolymerizations, initiators are used which absorb photons and thereby obtain energy to form radical pairs. Using alkyl benzoin ether as an example, the absorption of a photon to produce a molecule excited to a higher energy level may be represented by the equation:

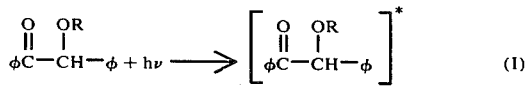  (I)

where $\phi$ is a phenyl group, R is an alkyl group and the asterisk indicates an excited molecule of higher energy due to absorption of the photon, Hv. The excited molecule than forms a radical pair:

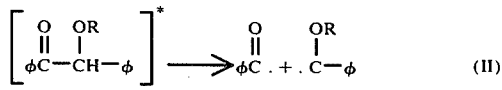  (II)

One or both members of the radical pair are then available to initiate addition polymerization of acrylic groups in the well-known manner. Because the photoinitiator does not require interaction with another compound to form free radicals, the reaction is termed unimolecular.

Free radicals necessary to the photopolymerization of acrylic groups may be produced by interaction of two compounds. Such reactions are therefore classed as bimolecular.

One type of bimolecular reaction is hydrogen abstraction. Here, a photosensitizer, which is a good absorber of photons but which itself is a poor photoinitiator, absorbs photons to produce an excited molecule. The excited molecule then inter-reacts with a second compound to produce free radicals. Using benzophenone as an example of a photosensitizer, the reactions may be represented:

$\phi_2C=O + h\nu \rightarrow \phi_2C=O*$   (III)

$\phi_2C=O_* + A\text{-}H \rightarrow \phi_2C\text{-}OH + A$   (IV)

where $\phi$ is a phenyl group, A is an organic or organometallic group, A-H is a monomer, a polymer or an added initiator which interacts with the photosensitizer and the asterisk has the meaning previously defined. In Equation IV, one or both of the free radicals are available to initiate addition polymerization of acrylic groups. It is important to note that in reactions of the hydrogen abstraction type, the photosensitizer is often destroyed by the process of generating free radicals.

Another type of bimolecular reaction is the energy donor type. Here a photosensitizer molecule absorbs a photon to produce an excited molecule. The excited molecule then transfers energy to a second molecule which produces radical pairs. Again using benzophenone as an example of a photosensitizer, the reactions may be represented:

  (V)

  (VI)

  (VII)

where $\phi$, A and the asterisk are as previously defined, B is an organic or inorganic group and A-B is a monomer, polymer or added initiator which interacts with the photosensitizer. In Equation VII, one or both free radicals are available to initiate addition polymerization of acrylic groups. It is important to note that in reactions of the energy donor type, the photosensitizer serves to transfer energy and is not destroyed in the process.

In bimolecular reactions of either the hydrogen abstraction type or the energy donor type, the second compound with which the excited photosensitizer molecule interacts may, depending upon the specific identity of the second compound, be an initiator or a monomer. In the latter case, the monomer itself may be said to function as an initiator.

The photopolymerization of compounds containing acrylic groups is often inhibited by the presence of oxygen. Although it is not desired to be bound by any theory, it is believed that the inhibition is due to the formation of peroxide at the site of chain propagation which quenches the reaction and thereby terminates chain growth.

It has now been found that the oxygen inhibition of the photopolymerization of resins containing acrylic groups may be substantially reduced by employing a photocatalyst system containing (1) as a photosensitizer at least one aromatic ketone or aromatic aldehyde which has a triplet energy in the range of from about 54 kilocalories per mole to about 72 kilocalories per mole and which promotes polymerization through bimolecular photochemical reactions of the energy donor type, and (2) as a photoinitiator at least one aromatic ketone which generates a radical pair by way of unimolecular homolysis resulting from photoexcitation, at least one member of said radical pair being capable of initiating addition polymerization of acrylic groups.

The catalyst system of the invention is employed in ultraviolet light curable coating compositions containing resins having acrylic unsaturation and capable of being free radically addition polymerized by interaction with the photocatalyst system upon exposure to ultraviolet light.

As used throughout the instant specification and claims, unless otherwise indicated, acrylic unsaturation is used in its broad sense to mean the unsaturation provided by unsubstituted acrylyl groups or $\alpha$-substituted acrylyl groups such as methacrylyl, ethacrylyl and $\alpha$-chloroacrylyl groups.

Examples of photosensitizers which may be used in the present invention are:
benzil 3,4-benzofluorene
1-naphthaldehyde
1-acetylnaphthalene
2,3-butanedione
1-benzoylnaphthalene
9-acetylphenanthrene
3-acetylphenanthrene
2-naphthaldehyde
2-acetylnaphthalene
2-benzoylnaphthalene
4-phenylbenzophenone
4-phenylacetophenone
anthraquinone
thioxanthone
3,4-methylenedioxyacetophenone
4-cyanobenzophenone
4-benzoylpyridine
2-benzoylpyridine
4,4'-dichlorobenzophenone
4-trifluoromethylbenzophenone
3-methoxybenzophenone
4-chlorobenzophenone
3-chlorobenzophenone
3-benzoylpyridine
4-methoxybenzophenone
3,4-dimethylbenzophenone
4-methylbenzophenone
benzophenone
2-methylbenzophenone
4,4'-dimethylbenzophenone
2,5-dimethylbenzophenone
2,4-dimethylbenzophenone
4-cyanoacetophenone
4-fluorobenzophenone
o-benzoylbenzophenone
4,4'-dimethoxybenzophenone
4-acetylpyridine
3,4,5-trimethylacetophenone
4-methoxybenzaldehyde
4-methylbenzaldehyde
3,5-dimethylacetophenone
4-bromoacetophenone
4-methoxyacetophenone
3,4-dimethylacetophenone
benzaldehyde
triphenylmethylacetophenone
anthrone
4-chloroacetophenone
4-trifluoromethylacetophenone
2-chloroanthraquinone
ethyl phenylglyoxylate
o-benzoylbenzoic acid
ethyl benzoylbenzoate
dibenzosuberone
o-benzoylbenzophenone
acrylyloxyethyl benzoylbenzoate
4-acrylyloxybenzophenone
2-acrylyloxyethoxybenzophenone The preffered photosensitizer is benzophenone. Mixtures of photosensitizers may be used, if desired.

Many of the photoinitiators which may be used in the present invention fall within the formula:

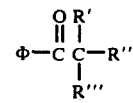

where φ is phenyl and R', R" and R''' are each independently hydrogen, halo, alkyl, alkoxy or phenyl, with the proviso that R', R" and R''' are not concurrently all hydrogen, all alkyl, or all phenyl, The various alkyl, alkoxy and phenyl groups comprising the molecule may be substituted to a minor extent with substituents which will not interfere with the utility of the compound as a photoinitiator. It is preferred that the alkyl, alkoxy and phenyl groups be unsubstituted. Examples of permissible substituents for the phenyl groups are halo, lower alkyl, lower alkoxy, carboxy and carbalkoxy.

When R', R" or R''' is alkyl, it usually contains from 1 to about 10 carbon atoms. From 1 to about 6 carbon atoms is typical. From 1 to about 4 carbon atoms is preferred.

When R', R" or R''' is alkoxy, it usually contains from 1 to about 6 carbon atoms. From 1 to about 4 carbon atoms is typical. The preferred alkoxy groups are methoxy and isobutoxy.

When R', R" or R''' are halo, it usually is fluoro, chloro or bromo. Chloro and bromo are most often used. Chloro is preferred.

Many of the photoinitiators which may be used fall within one of the subgeneric classes of compounds represented by the following formulae:

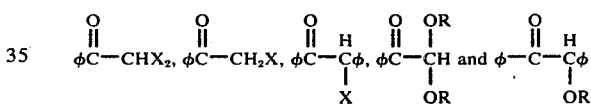

where φ represents unsubstituted phenyl, X represents halo which is usually chloro or bromo, and R represents alkyl having from 1 to about 6 carbon atoms, usually from 1 to about 4 carbon atoms. When there are a plurality of X groups or a plurality of R groups on the molecule, they are usually the same although they can be different.

Examples of photoinitiators which may be used in the present invention are:
ethyl benzoin ether
isopropyl benzoin ether
butyl benzoin ether
isobutyl benzoin ether
α, α-diethoxyacetophenone
α, α-diethoxy-α-phenylacetophenone
α, α-dimethoxy-α-phenylacetophenone
4,4'-dicarboethoxybenzoin ethyl ether
benzoin phenyl ether
α-methylbenzoin ethyl ether
α-methylolbenzoin methyl ether
α, α, α-trichloroacetophenone The preferred photoinitiators are isobutyl benzoin ether, mixtures of butyl isomers of butyl benzoin ether and α, α-diethoxyacetophenone. Mixtures of photoinitiators may be used, if desired.

Useful resins having acrylic unsaturation and capable of being free radically addition polymerized by interaction with the photocatalyst system upon exposure to ultraviolet light are polymers having acrylic unsaturation in sidechains attached to the molecular backbone of the polymer or they are oligomers having a plurality of acrylic groups.

Polymers having acrylic unsaturation in sidechains attached to the molecular backbone are usually prepared by including one or more monomers which, when interpolymerized with other monomers, to form the polymer, provides reactive sites attached to the polymer along the backbone. Acrylically unsaturated compounds having at least one functional group which will react with the reactive sites on the polymeric backbone are then used to introduce the acrylic unsaturation into the molecule. The usual reactive sites attached directly or indirectly to the polymer are hydroxy, amino, carboxy, carbamyl, isocyanato or epoxy. Hydroxy or carboxy are most often used. When the reactive sites are hydroxy, the acrylically unsaturated compound usually has carboxy, haloformyl (most often chloroformyl) or isocyanato functionality. When the reactive sites on the polymer are amino, the acrylically unsaturated compound usually has isocyanato, haloformyl (again, most often chloroformyl) or epoxy functionality. When the reactive sites on the polymer are carboxy, the acrylically unsaturated compound generally has hydroxy, epoxy or isocyanato functionality. When the reactive sites are carbamyl, they are usually reacted with formaldehyde to produce N-methylol carbamyl groups. When the reactive sites are isocyanato, the acrylically unsaturated compound ordinarily contains hydroxy or carboxy functionality. When the reactive sites are epoxy (usually glycidyl), the acrylically unsaturated compound generally has carboxy functionality. The acrylically unsaturated compound ordinarily contains carboxy, haloformyl or isocyanato functionality.

The polymer having reactive sites attached thereto can itself be any of many types, as for example, polyacrylates, polyamides, polyesters, polyethers or polyurethanes.

The term polyacrylate is used in its broadest sense to include not only polymerized unsubstituted acrylates, but also polymerized α-substituted acrylates, such as methacrylates, ethacrylates and α-chloroacrylates. Compounds from any of these subclasses may be used alone, but most often, compounds from two or more subclasses are interpolymerized.

Examples of suitable monomers which may be used in the preparation of the polyacrylate polymer include methyl acrylate, ethyl acrylate, propyl acrylate, isopropyl acrylate, butyl acrylate, isobutyl acrylate, sec-butyl acrylate, tert-butyl acrylate, amyl acrylate, hexyl acrylate, heptyl acrylate, octyl acrylate, 2-ethylhexyl acrylate, decyl acrylate, dodecyl acrylate, methyl methacrylate, ethyl methacrylate, propyl methacrylate, isopropyl methacrylate, butyl methacrylate, isobutyl methacrylate, sec-butyl methacrylate, tert-butyl methacrylate, amyl methacrylate, hexyl methacrylate, heptyl methacrylate, octyl methacrylate, 2-ethylhexyl methacrylate, decyl methacrylate, dodecyl methacrylate methyl α-chloro-acrylate, ethyl α-chloroacrylate, propyl α-chloroacrylate, hexyl α-chloro-acrylate, octyl α-chloroacrylate, decyl α-chloroacrylate and dodecyl α-chloroacrylate. Esters of unsubstituted acrylic acid and methacrylic acid are most often used.

Acrylic monomers which introduce reactive sites to the polymer molecule are acrylic acid, 2-hydroxyethyl acrylate, 2-hydroxypropyl acrylate, 3-hydroxypropyl acrylate, glycidyl acrylate, acrylamide, 2-aminoethyl acrylate, methacrylic acid, 2-hydroxyethyl methacrylate, 2-hydroxypropyl methacrylate, 3-hydroxypropyl methacrylate, glycidyl methacrylate, methacrylamide, 2-aminoethyl methacrylate, 3-aminopropyl methacrylate and α-chloroacrylic acid.

Other ethylenically unsaturated monomers are often included. Examples of these compounds are styrene and α-methylstyrene.

The amount of acrylic monomers which are used to introduce reactive sites to the polymer molecule may vary widely, but they are ordinarily present in the range of from about 3 percent to about 50 percent by weight of the ethylenically unsaturated monomers interpolymerized. An amount in the range of from about 4 percent to about 25 percent is most often the case.

Addition polymerization may be effectuated by combining the ethylenically unsaturated monomers with a free radical initiator and heating the mixture. Exemplary free radical initiators are organic peroxides such as ethyl peroxide and benzoyl peroxide; hydroperoxides such as methyl hydroperoxide, acyloins such as benzoin; certain azo compounds such as α, α'-azobisisobutyronitrile and γ, γ'-azobis(γ-cyanovaleric acid); persulfates; peracetates such as methyl peracetate and tert-butyl peracetate; peroxalates such as dimethyl peroxalate and di(tert-butyl) peroxalate; disulfides such as dimethyl thiuram disulfide and ketone peroxides such as methyl ethyl ketone. In lieu of the chemical free radical initiators, high energy ionizing particles irradiation, high energy ionizing electromagnetic radiation or actinic light in conjunction with a photoinitiator may be used as a source of free radicals. High energy ionizing particle radiation includes accelerated electrons; highly accelerated nuclear particles such as protons, neutrons, alpha particles, deuterons and beta particles. High energy ionizing electromagnetic radiation includes X-rays and gamma rays. Actinic light is usually ultraviolet light. The polymerization may be accomplished in the presence or absence of an inert solvent. When chemical initiators are used, temperatures in the range of from about 75° F. to about 400° F. are generally employed. More often, temperatures in the range of from about 100° F. to about 300° F. are used.

When the polymer is a polyamide, polyester, polyether or polyurethane, the principles are analogous to those given for the polyacrylates. The known reactions for forming such polymers will, of course, be used instead of the addition polymerization reaction illustrated above for the polyacrylates.

Organic ultraviolet light curable acrylic oligomers, which may be used as the resin in the invention, generally comprise divalent, trivalent or tetravalent organic radicals whose bonds are satisfied with unsubstituted acrylyloxy or α-substituted acrylyloxy groups. The polyvalent radical may be aliphatic, cycloaliphatic or aromatic. Usually, the molecular weight of the oligomer is in the range of from about 170 to about 1000. Examples of such oligomers are the diacrylates and dimethacrylates of ethylene glycol, 1,3-propanediol, propylene glycol, 2,3-butanediol, 1,4-butanediol, 2-ethylbutane-1,4-diol, 1,5-pentanediol, 1,6-hexanediol, 1,7-heptanediol, 1,8-octanediol, 1,9-nonanediol, 1,10-decanediol, 2,10-decanediol, 1,4-cyclohexanediol, 1,4-dimethylolcyclohexane, 2,2-diethyl-propane-1,3-diol, 2,2-dimethylpropane-1,3-diol, 3-methylpentane-1,4-diol, 2,2-diethylbutane-1,3-diol, 4,5-nonanediol, diethylene glycol, triethylene glycol, propylene glycol, neopentyl glycol, 5,5-dimethyl-3,7-dioxanonane-1,9-diol, 2,2-dimethyl-3-hydroxypropyl 2,2-dimethyl-3-hydroxypropionate, Bisphenol A diglycidyl ether, 1,4-butanediol diglycidyl ether and neopentyl glycol diglycidyl ether; the triacrylates, trimethacrylates, diacrylates and dimethacrylates of glycerol, 1,1,1-trimethylolpropane and trimethylolethane; and the tetracrylates, tetramethacrylates, triacrylates, trimethacrylates, diacrylates and dimethacrylates of pentaerythritol and erythritol. The acrylic groups on the oligomer molecules are usually the same, but the may be different as exemplified by the compound 2,2-dimethyl-1-acrylyloxy-3-methacrylyloxypropane.

Other examples of satisfactory acrylic oligomers are acrylic polyester and acrylic polyamide molecules represented by the formulae:

(I)

and

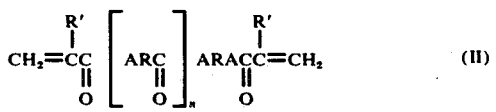
(II)

wherein $n$ is an integer in the range of from 1 to 4;

each R independently represents a divalent aliphatic, cycloaliphatic or aromatic hydrocarbon radical having from 1 to 10 carbon atoms;

each R' independently represents hydro, methyl or ethyl;

and each A independently represents O or NH. It is preferred that every A represent O. The polyester and polyamide oligomers represented by formula (I) may be prepared by reacting dicarboxylic acids or acid amides and dihydric alcohols or diamines and then reacting the product with an unsubstituted acrylic acid or an α-substituted acrylic acid. The acrylic polyester and polyamide oligomers represented by formula (II) may be prepared by reacting a hydroxyfunctional monocarboxylic acid, a dimer, trimer or a tetramer of such acid, an amino functional monocarboxylic acid or a dimer, trimer or tetramer of such acid with an unsubstituted or α-substituted acrylic acid. Where desired, the lactone may be used in lieu of the hydroxy functional monocarboxylic acid and the lactam may be used in place of the amino functional monocarboxylic acid.

A mixture of resins having acrylic unsaturation may be used, if desired.

Monomers having monoacrylic functionality which crosslink with the resin having acrylic unsaturation may optionally be present in the coating composition. Examples of monoacrylic functional monomers which may be used are methyl acrylate, methyl methacrylate, ethyl acrylate, ethyl methacrylate, propyl acrylate, propyl methacrylate, butyl acrylate, butyl methacrylate, hexyl acrylate, hexyl methacrylate, octyl acrylate and octyl methacrylate. The preferred monoacrylic functional monomers are liquid compounds miscible with the resin. The use of one or more monoacrylic functional monomers is desirable because the greater mobility of the smaller monomer molecule, as compared to the larger resin molecule, allows crosslinking to proceed faster than if the monoacrylic functional monomer were absent. Another benefit is that the monoacrylic functional monomer usually acts as a reactive solvent for the resin thereby providing coating compositions having a satisfactory low viscosity without using an inordinate amount, if any at all, of volatile, nonreactive solvent.

The monoacrylic functional monomer, or mixtures of monoacrylic functional monomers, may be employed over a broad range. At the lower end of the range, no vinyl monomer need be used. The amount of monomer when used should be sufficient to provide a liquid, flowable, interpolymerizable mixture. Ordinarily the monomer will be present in the coating composition in the range of from about 0 to about 80 percent by weight of the binder of the coating composition. When used, the monoacrylic functional monomer will ordinarily be in the range of from about 15 to about 30 percent by weight of the binder.

Extender pigments which are generally transparent to ultraviolet light are optional ingredients which are often included in the coating composition. Examples of suitable extender pigments are finely divided particles of silica, barytes, calcium carbonate, talc, magnesium silicate, aluminum silicate, etc. Extender pigment is generally present in an amount in the range of from about 0 to about 70 percent by weight of the coating composition. An amount in the range of from about 0 to about 50 percent is more often employed. When extender pigment is used, it is usually present in the range of from about 1 to about 35 percent by weight of the coating composition. Although a single extender pigment is ordinarily used, mixtures of several extender pigments are satisfactory.

Ultraviolet light absorbing pigments may optionally be used in amounts which do not preclude curing of the interior of the coating. The maximum amount is therefore related to the thickness of the coating to be cured. Thin coatings may tolerate more ultraviolet light absorbing pigment than thick coatings. Amounts in the range of from about 0 percent to about 50 percent by weight based on the weight of the binder may be used. For thicker coatings, from about 0 percent to about 25 percent are satisfactory. Examples of suitable ultraviolet light absorbing pigments are titanium dioxide, antimony oxide, zinc oxide, zirconium oxide, zinc sulfide and lithopone. Mixtures of pigments may be used.

Another optional ingredient which is often included in the coating composition is an inert volatile organic solvent. Mixtures of several inert volatile organic solvents may be used when desired. Like the extender pigment, the inert volatile organic solvent does not ordinarily provide significant additional hiding, but it accelerates the rate at which opacity is obtained. Examples of suitable inert volatile organic solvents are acetone, methyl ethyl ketone, methyl isobutyl ketone, methyl alcohol, ethyl alcohol, propyl alcohol, isopropyl alcohol, butyl alcohol, sec-butyl alcohol, isobutyl alcohol, tert-butyl alcohol, amyl alcohol, hexyl alcohol, 2-ethylhexyl alcohol, cellosolve, ethyl cellosolve, cellosolve acetate, 2-ethylhexyl acetate, tetrahydrofuran, and aliphatic naphtha. Solvent of this type is ordinarily present in the coating composition in the range of from about 0 to about 40 percent by weight of the vehicle of the coating composition. From about 0 to about 15 percent is typical. When inert volatile organic solvent is used, it is usually present in the range of from about 1 to about 15 percent by weight of the vehicle.

The coating compositions of the invention are usually prepared by simply admixing the various ingredients. The compounds comprising the photocatalyst system may be premixed and then admixed with the other ingredients of the coating composition or they may be added separately. Although mixing is usually accomplished at room temperature, elevated temperatures are sometimes used. The maximum temperature which is usable depends upon the heat stability of the ingredients. Temperatures above about 200° C. are only rarely employed.

The ultraviolet light curable coating compositions of the invention are generally used to form cured adherent coatings on substrates. The substrate is coated with the coating composition using substantially any technique known to the art. These include spraying, curtain coating, dipping, roller application, printing, brushing, drawing and extrusion. The coated substrate is then exposed to ultraviolet light to cure (viz., C-stage) the coating into a hard, mar and abrasion resistant film.

The amount of aromatic ketone or aromatic aldehyde photosensitizer present in the photocatalyst system of the invention may vary widely. Often it is present in the range of from about 25 percent to about 90 percent by weight of the photocatalyst system. An amount in the range of from about 35 percent to about 80 percent is typical. From about 45 percent to about 75 percent is preferred.

The amount of aromatic ketone photoinitiator present in the photocatalyst system in the invention may likewise vary widely. Often it is present in the range of from about 10 percent to about 75 percent by weight of the photocatalyst system. An amount in the range of from about 20 percent to about 65 percent is more often used. From about 25 percent to about 55 percent is preferred.

The amount of aromatic ketone or aromatic aldehyde photosenitizer present in the ultraviolet light curable coating compositions of the invention may be widely varied. Usually the photosensitizer is present in an amount in the range of from about 0.01 percent to about 50 percent based on the weight of the binder of the coating composition. More often an amount in the range of from about 0.01 percent to about 20 percent is employed. From about 0.5 to about 10 percent by weight based on the weight of the binder is preferred.

The amount of aromatic ketone photoinitiator present in the coating composition may also be widely varied. Ordinarily the photoinitiator is present in an amount in the range of from about 0.01 percent to about 10 percent by weight based on the weight of the binder of the coating composition. Most often an amount in the range of from about 0.05 percent to about 7 percent is used. From about 0.1 percent to about 5 percent by weight based on the weight of the binder is preferred.

The amount of polymerizable resin having acrylic unsaturation present in the coating composition is subject to wide variation. The resin is ordinarily present in an amount in the range of from about 20 to 100 percent by weight of the binder of the coating composition. An amount in the range of from about 50 to 100 percent is typical. From about 80 to 100 percent by weight of the binder is preferred.

Cured coatings of the ultraviolet light curable coating composition of the invention usually have thicknesses in the range of from about 0.1 to about 100 mils. More often they have thicknesses in the range of from about 0.3 to about 10 mils.

Any suitable source which emits ultraviolet ultraviolet light, viz., electromagnetic radiation having a wavelength in the range of from about 1800 to about 4000 Angstrom units, may be used in the practice of this invention. Suitable sources are mercury arcs, carbon arcs, low pressure mercury lamps, medium pressure mercury lamps, high pressure mercury lamps, swirl-flow plasma arc, ultraviolet light emitting diodes and ultraviolet light emitting lasers. Particularly preferred are ultraviolet light emitting lamps of the medium or high pressure mercury vapor type. Such lamps usually have fused quartz envelopes to withstand the heat and transmit the ultraviolet radiation and are ordinarily in the form of long tubes having an electrode at either end. Examples of these lamps are PPG Models 60-2032, 60-0393, 60-0197 and 60-2081 and Hanovia Models 6512A431, 6542A431 and 6577A431.

The time of exposure to ultraviolet light and the intensity of the ultraviolet light to which the coating composition is exposed may vary greatly. Generally the exposure to ultraviolet light should continue until the C-stage is reached where hard, mar and abrasion resistant films result.

Substrates which may be coated with the compositions of this invention may vary widely in their properties. Organic substrates such as wood, fiberboard, particle board, composition board, paper, cardboard and various polymers such as polyesters, polyamides, cured phenolic resins, cured aminoplasts, acrylics, polyurethanes and rubber may be used. Inorganic substrates are exemplified by glass, quartz and ceramic materials. Many metallic substrates may be coated. Exemplary metallic substrates are iron, steel, stainless steel, copper, brass, bronze, aluminum, magnesium, titanium, nickel, chronium, zinc and the alloys.

In the illustrative examples which follow, all parts and parts by weight and percentages are percent by weight unless otherwise specified.

EXAMPLE I

A reactor equipped with a thermometer, a heater, an agitator and a source of air is charged with 29.0 parts acrylic acid, 1.6 part 2,6-di-tert-butylparacresol, 4.0 parts dimethyl benzyl amine and 0.016 part hydroquinone. After heating the charged materials to 105° C., the addition of 500 parts butanediol diglycidyl ether is begun. Four and one-half hours later the addition is completed. The contents of the reactor are then agitated at a temperature of about 100° C. for about 6 hours and 25 minutes and then allowed to cool to room temperature overnight. The contents of the reactor are then heated to 100° C. for 2 hours and 15 minutes with an air purge to remove excess acid and then cooled to room temperature. The acid number of resulting polymer is 9.02 and the hydroxyl number is 283. The Gardner-Holdt viscosity of the product acrylic resin composition is U.

A first coating composition is prepared by admixing 100 parts of the above acrylic resin composition and 2 parts of a mixture of butyl isomers of butyl benzoin ether (Trigonal-14; Noury Chemical Corp.)

A second coating composition is prepared by admixing 100 parts of the above acrylic resin composition, 2 parts Trigonal-14 and 4 parts benzophénone.

Each of the above coating compositions is coated onto separate substrates. The coated substrates are passed once in air at 200 feet per minute under a source of ultraviolet light.

The coating of the first coating composition is observed to be wet, i.e., uncured. The coating of the second coating composition is observed to be cured into an excellent film which cannot be marred with a fingernail.

none content, curing conditions and observed mar resistances are shown in Table I.

TABLE I

| BENZOPHENONE CONTENT, PARTS/100 PARTS ACRYLIC RESIN COMPOSITION | NUMBER OF PASSES UNDER UV SOURCE | SPEED PASSED UNDER UV SOURCE, FT/MIN. | MAR RESISTANCE |
|---|---|---|---|
| 0 | 1 | 30 | Very Hard to Mar |
| 0 | 2 | 40 | Can Be Marred |
| 0 | 2 | 70 | " |
| 1 | 1 | 30 | Mar-Free |
| 1 | 1 | 50 | " |
| 1 | 1 | 65 | " |
| 1 | 2 | 80 | " |
| 2 | 1 | 65 | Mar-Free |
| 2 | 1 | 80 | " |
| 2 | 2 | 90 | " |
| 2 | 2 | 100 | " |
| 3 | 1 | 100 | Mar-Free |
| 3 | 1 | 110 | " |
| 3 | 2 | 120 | " |
| 4 | 1 | 130 | Mar-Free |
| 4 | 2 | 140 | " |
| 5 | 1 | 150 | Mar-Free |
| 5 | 1 | 160 | " |
| 5 | 1 | 170 | " |
| 5 | 1 | 185 | Very Hard to Mar |
| 5 | 2 | 200 | Mar-Free |
| 6 | 1 | 200 | Mar-Free |
| 6 | 1 | 220 | " |
| 6 | 2 | 250 | " |

EXAMPLE II

One mole of bisphenol A-diglycidyl ether (Epon 828; Shell Chemical Co.) is reacted with two moles acrylic acid to produce the diacrylate of bisphenol A-diglycidyl ether.

A first coating composition is prepared by admixing 70 parts of the above diacrylate of bisphenol A-diglycidyl ether, 30 parts methylcellosolve acrylate and 2 parts Trigonal-14.

A second coating composition is prepared by admixing 70 parts of the aove diacrylate of bisphenol A-diglycidyl ether, 30 parts methylcellosolve acrylate, 2 parts Trigonal-14 and 4 parts benzophenone.

Each of the above coating compositions is coated onto separate substrates. The coated substrates are passed once in air under a source of ultraviolet light. The coating of the first coating composition is able to be cured at a maximum speed of only 40 feet per minute while the coating of the second coating composition is able to be cured at a speed of 60 feet per minute.

EXAMPLE III

Six coating compositions are each prepared by admixing 100 parts of the arcylic resin composition of Example I, 2 parts Trigonal-14 and 1,2,3,4,5 and 6 parts benzophenone, respectively. A control coating composition is prepared by admixing 100 parts of the acrylic resin composition of Example I and 2 parts Trigonal-14 but no benzophenone.

Each of the above coating compositions is coated onto separate substrates. The coated substrates are passed in air under a source of ultraviolet light and tested and fingernail mar resistance. The benzophe-

EXAMPLE IV

A polyester resin is prepared in the conventional manner by reacting 272.8 parts ethylene glycol and 296 parts phthalic anhydride in the presence of 0.57 part butyl stannoic acid. The Gardner-Holdt viscosity is $Z-2^+$ and the acid number of the polyester is about 0.84.

A polyester diacrylate is prepared by reacting 777 parts of the above polyester resin and 475 parts acrylic acid in the presence of 2290 parts toluene, 9.6 parts hydroquinone, 28.7 parts sulfuric acid, 170 parts n-hexane, 25 parts sodium sulfate and 150 parts methanol. The solvents are removed by distillation leaving a polyester diacrylate composition having a solids content of $99^-$ percent, a Gardner-Holdt viscosity of U-V and an acid number of about 2.

A first coating composition is prepared by admixing 100 parts of the above polyester diacrylate composition and 4 parts benzophenone.

A second coating composition is prepared by admixing 100 parts of the above polyester diacrylate composition and 4 parts α, α-diethoxy-acetophenone.

A third coating composition is prepared by admixing 100 parts of the above polyester diacrylate composition, 2 parts benzophenone and 2 parts α, α-diethoxyacetophenone.

Each of the above coating compositions is coated onto separate substrates. The coated substrates are passed in air once under four ultraviolet light emitting mercury vapor tubes. The maximum speed with which the coated substrates can be passed under the tubes and to obtain cured coatings is determined. The cured coatings are tested for fingernail mar resistance.

For the first coating composition, the maximum speed is five feet per minute; the mar resistance is poor as determined by the fingernail test.

For the second coating composition, the maximum speed is fifty feet per minute; the surface is mar-free after the fingernail test.

For the third coating composition, the maximum speed is one hundred feet per minute; the surface is mar-free after the fingernail test.

EXAMPLE V

A first coating composition is prepared by admixing 100 parts of the polyester diacrylate composition of Example IV and 2 parts isobutyl benzoin ether.

A second coating composition is prepared by admixing 100 parts of the polyester diacrylate composition of Example IV, 2 parts isobutyl benzoin ether and 2.3 parts benzophenone.

Each of the above coating compositions is coated onto separate aluminum substrates using a number 010 draw bar. The coated substrates are passed in air once under four ultraviolet light emittting mercury vapor tubes. The maximum speed with which the coated substrates can be passed under the tubes to obtain cured coatings having a fingernail test of mar-free is determined.

For the first coating composition, the maximum speed is 40 feet per minute.

For the second coating composition, the maximum speed is 90 feet per minute.

I claim:
1. A photocatalyst system comprising
   a. at least one aromatic ketone or aromatic aldehyde photosensitizer which
      1. has a triplet energy in the range of from about 54 kilocalories per mole to about 72 kilocalories per mole, and
      2. promotes polymerization bimolecular photochemical reactions of the energy donor type; and
   b. at least one aromatic ketone photoinitiator which generates a radical pair by way of unimolecular homolysis resulting from photoexcitation, at least one member of said radical pair being capable of initiating addition polymerization of acrylic groups, said aromatic ketone photoinitiator being selected from the group consisting of ethyl benzoin ether, isopropyl benzoin ether, butyl benzoin ether, isobutyl benzoin ether, $\alpha$, $\alpha$-diethoxyacetophenone, $\alpha$, $\alpha$-diethoxy-$\alpha$-phenylacetophenone, $\alpha$, $\alpha$-dimethoxy-$\alpha$-phenylacetophenone, 4,4'-dicarboethoxybenzoin ethyl ether, benzoin phenyl ether, $\alpha$-methylbenzoin ethyl ether, $\alpha$-methylolbenzoin methyl ether, $\alpha$, $\alpha$, $\alpha$-trichloroacetophenone, mixtures of butyl isomers of butyl benzoin ether, and mixtures thereof.

2. The photocatalyst system of claim 1 wherein said photosensitizer is present in an amount in the range of from about 25 percent to about 90 percent by weight of said photocatalyst system and wherein said photoinitiator is present in an amount in the range of from about 10 percent to about 75 percent by weight of said photocatalyst system.

3. The photocatalyst system of claim 2 wherein said photosensitizer is benzophenone.

4. The photocatalyst system of claim 3 wherein said photoinitiator is isobutyl benzoin ether.

5. The photocatalyst system of claim 3 wherein said photoinitiator is a mixture of butyl isomers of butyl benzoin ether.

6. A ultraviolet high curable coating composition comprising:
   a. at least one aromatic ketone or aromatic aldehyde photosensitizer which
      1. has a triplet energy in the range of from about 54 kilocalories per mole to about 72 kilocalories per mole, and
      2. promotes photopolymerization through bimolecular photochemical reactions of the energy donor type;
   b. at least one aromatic ketone photoinitiator which generates a radical pair by way of unimolecular homolysis resulting from photoexcitation, at least one number of said radical pair being capable of initiating addition polymerization of acrylic groups, said aromatic ketone photoinitiator being selected from the group consisting of ethyl benzoin ether, isopropyl benzoin ether, butyl benzoin ether, isobutyl benzoin ether, $\alpha$, $\alpha$-diethoxyacetophenone, $\alpha$, $\alpha$-diethoxy-$\alpha$-phenylacetophenone, $\alpha$, $\alpha$-dimethoxy-$\alpha$-phenylacetophenone, 4,4'-dicarboethoxybenzoin ethyl ether, benzoin phenyl ether, $\alpha$-methylbenzoin ethyl ether, $\alpha$-methylolbenzoin methyl ether, $\alpha$, $\alpha$, $\alpha$-trichloroacetophenone, mixtures of butyl isomers of butyl benzoin ether, and mixtures thereof;
   and
   c. a resin having acrylic unsaturation and capable of being free radially addition polymerized by interaction with said photosensitizer and said photoinitiator upon exposure to ultraviolet light.

7. The ultraviolet light curable coating composition of claim 6 wherein:
   a. said photosensitizer is present in an amount in the range of from about 0.01 percent to about 50 percent by weight of the binder of said coating composition;
   b. said photoinitiator is present in an amount in the range of from about 0.01 percent to about 10 percent by weight of the binder of said coating composition; and
   c said resin is present in an amount in the range of from about 20 to 100 percent by weight of the binder of said coating composition.

8. The ultraviolet light curable coating composition of claim 7 wherein said photosensitizer is benzophenone.

9. The ultraviolet light curable coating composition of claim 8 wherein said photoinitiator is isobutyl benzoin ether.

10. The ultraviolet light curable coating composition of claim 8 wherein said photoinitiator is a mixture of butyl isomers of butyl benzoin ether.

11. The ultraviolet light coating composition of claim 7 wherein monoacrylic functional monomer is present in the range of from about 0 to about 80 percent by weight of the binder of said coating composition.

12. The ultraviolet light curable coating composition of claim 7 wherein extender pigment which is generally transparent to ultraviolet light is present in an amount in the range of from about 0 to about 70 percent by weight of said coating composition.

13. A method comprising:
   a. coating a substrate with an ultraviolet light curable coating composition comprising
      1. at least one aromatic ketone or aromatic aldehyde photosensitizer which
         a. has a triplet energy in the range of from about 54 kilocalories per mole to about 72 kilocalories per mole, and b. promotes polymerization through bimolecular photochemical reactions of the energy donor type, 2. at least one aromatic ketone photoinitiator which generates a radical pair by way of unimolecular homolysis resulting from photoexcitation, at least one member of said radical pair being capable of initiating addition polymerization of acrylic groups, said aromatic ketone photoinitiator being selected from the group consisting of ethyl benzoin ether, isopropyl benzoin ether, butyl benzoin ether, isobutyl benzoin ether, α, α-diethoxyacetophenone, α, α-diethoxy-α-phenylacetophone, α, α-dimethoxy-α-phenylacetophenone, 4,4'-dicarboethoxybenzoin ethyl ether, benzoin phenyl ether, α-methylbenzoin ethyl ether, α-methylbenzoin methyl ether, α, α, α-trichloroacetophenone, mixtures of butyl isomers of butyl benzoin ether, and mixtures thereof, and 3. a resin having acrylic unsaturation and capable of being free radically addition polymerized by interaction with said photosensitizer and said photoinitiator upon exposure to ultraviolet light;

and b. exposing said coated substrate to ultraviolet light to cure said coating into a hard mar and abrasion resistant film.

14. The method of claim 13 wherein:

a. said photosensitizer is present in an amount in the range of from about 0.01 percent to about 50 percent by weight of the binder of said coating composition;

b. said photoinitiator is present in an amount in the range from about 0.01 percent to about 10 percent by weight of the binder of said coating composition; and c. said resin is present in an amount in the range of from about 20 to 100 percent by weight of the binder of said coating composition.

15. The method of claim 14 wherein said photosensitizer is benzophenone.

16. The method of claim 15 wherein said photoinitiator is isobutyl benzoin ether.

17. The method of claim 15 wherein said photoinitiator is a mixture of butyl isomers of butyl benzoin ether.

18. The photocatalyst system of claim 1 wherein said photoinitiator is selected from the group consisting of α, α-diethoxyacetophenone, α, α-diethoxy-α-phenylacetophenone, α, α-dimethoxy-α-phenylacetophenone and mixtures thereof.

19. The ultraviolet light curable coating composition of claim 1 wherein said photoinitiator is selected from the group consisting of α, α-diethoxyacetophenone, α, α-diethoxy-α-phenylacetophenone, α, α-dimethoxy-α-phenylacetophenone and mixtures thereof.

20. The method of claim 13 wherein said photoinitiator is selected from the group consisting of α, α-diethoxyacetophenone, α, α-diethoxy-α-phenylacetophenone, α, α-dimethoxy-α-phenylacetophenone and mixtures thereof.

* * * * *

UNITED STATES PATENT OFFICE
CERTIFICATE OF CORRECTION

Patent No. 4,017,652　　　　　Dated April 12, 1977

Inventor(s) Gerald W. Gruber

It is certified that error appears in the above-identified patent and that said Letters Patent are hereby corrected as shown below:

Column 1, line 38, that portion of the formula reading "$\underset{\phi\overset{\|}{C}.\ +\ .C-\phi}{O\qquad OR}$"

should read $-- \underset{\phi\overset{\|}{C}\cdot\ +\ \cdot\overset{|}{C}H-\phi}{O\qquad OR} --$.

Column 1, line 60, that portion of the formula reading "$\phi_2C=O_=$"

should read $--\phi_2C=O^*--$ ; that portion of the formula reading

"$\phi_2C-OH + A$" should read $--\phi_2\overset{\cdot}{C}-OH + A\cdot --$.

Column 13, line 32, insert --through-- after "polymerization".

Column 13, line 65, "A" should be --An--; "high" should be --light--.

Column 14, line 10, "number" should be --member--.

Column 14, line 26, "radially" should be --radically--.

Column 14, line 39, insert --.-- after "c".

Column 14, line 51, insert --curable-- after "light".

UNITED STATES PATENT OFFICE
CERTIFICATE OF CORRECTION

Patent No. 4,017,652          Dated April 12, 1977

Inventor(s) Gerald W. Gruber

It is certified that error appears in the above-identified patent and that said Letters Patent are hereby corrected as shown below:

Column 15, line 14, "thoxy-α-phenylacetophone" should be --thoxy-α-phenylacetophenone--.

Column 15, line 17, "α-methylbenzoin" should be --α-methylolbenzoin--.

Column 16, line 24, "1" should be --6--.

Signed and Sealed this fifth Day of July 1977

[SEAL]

Attest:

RUTH C. MASON
Attesting Officer

C. MARSHALL DANN
Commissioner of Patents and Trademarks

REEXAMINATION CERTIFICATE (575th)

United States Patent [19]

Gruber

[11] B1 4,017,652

[45] Certificate Issued  Sep. 30, 1986

[54] PHOTOCATALYST SYSTEM AND ULTRAVIOLET LIGHT CURABLE COATING COMPOSITIONS CONTAINING THE SAME

[75] Inventor: Gerald W. Gruber, Sewickley, Pa.

[73] Assignee: PPG Industries, Inc., Pittsburgh, Pa.

Reexamination Request:
No. 90/000,743, Mar. 21, 1985

Reexamination Certificate for:
Patent No.: 4,017,652
Issued: Apr. 12, 1977
Appl. No.: 517,572
Filed: Oct. 23, 1974

Certificate of Correction issued Jul. 5, 1977.

[51] Int. Cl.$^4$ ............ B05D 3/06; C08F 2/50
[52] U.S. Cl. .................. 427/54.1; 522/7; 522/8; 522/12; 522/19; 522/21; 522/23; 522/902
[58] Field of Search ........ 522/7, 8, 12, 19, 21, 522/23, 902

[56] References Cited

U.S. PATENT DOCUMENTS

| | | | |
|---|---|---|---|
| 3,368,900 | 2/1968 | Burg | 96/115 |
| 3,427,161 | 2/1969 | Laridon et al. | 96/35.1 |
| 3,644,120 | 2/1972 | Kai et al. | 96/115 |
| 3,715,293 | 2/1973 | Sandner et al. | 204/159.14 |
| 3,756,827 | 9/1973 | Chang | 96/86 P |
| 3,759,807 | 9/1973 | Osborn et al. | 204/159.23 |
| 3,801,329 | 4/1974 | Sandner et al. | 96/115 P |
| 3,824,284 | 7/1974 | Rudolph et al. | 260/559 R |
| 3,825,479 | 7/1974 | Carlick et al. | 204/159.23 |
| 3,827,960 | 8/1974 | McGinnis | 204/159.24 |
| 3,840,448 | 10/1974 | Osborn et al. | 204/159.14 |

OTHER PUBLICATIONS

*The Chemist's Companion*, by Arnold J. Gordon et al., (1972), John Wiley and Sons, Inc., pp. 350-355.
*Molecular Photochemistry* by Nicholas J. Turro, (1965), W. A. Benjamin, Inc., p. 132.
*Angew. Chem. Int. Edit.*, vol. 11, No. 11 (1972), by H. G. Heine et al., "Aromatic . . . Photopolymerization".

*Primary Examiner*—Thurman K. Page

[57] ABSTRACT

The oxygen inhibition of the photopolymerization of acrylic resins is reduced by employing a photocatalyst system containing an aromatic ketone and/or aromatic aldehyde photosensitizer having a triplet energy in the range of from about 54 kilocalories per mole to about 72 kilocalories per mole and which promotes polymerization through bimolecular photochemical reactions of the energy donor type and an aromatic ketone photoinitiator which generates a radical pair by way of unimolecular homolysis resulting from photoexcitation. An exemplary photocatalyst system is benzophenone and isobutyl benzoin ether.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–20 is confirmed.

* * * * *